(12) United States Patent
Vargas et al.

(10) Patent No.: US 10,563,932 B2
(45) Date of Patent: Feb. 18, 2020

(54) PROCESS AND APPARATUS FOR COOLING CATALYST

(71) Applicant: UOP LLC, Des Plaines, IL (US)

(72) Inventors: Juan C. Vargas, Kingston (GB); Dharmesh C. Panchal, Surbiton (GB)

(73) Assignee: UOP LLC, Des Plaines, IL (US)

(*) Notice: Subject to any disclaimer, the term of this patent is extended or adjusted under 35 U.S.C. 154(b) by 0 days.

(21) Appl. No.: 15/851,585

(22) Filed: Dec. 21, 2017

(65) Prior Publication Data

US 2019/0195574 A1   Jun. 27, 2019

(51) Int. Cl.
| | | |
|---|---|---|
| *F28D 7/12* | (2006.01) | |
| *F28F 13/12* | (2006.01) | |
| *B01J 8/18* | (2006.01) | |
| *B01J 8/40* | (2006.01) | |
| *F28D 21/00* | (2006.01) | |

(52) U.S. Cl.
CPC ............. *F28F 13/12* (2013.01); *B01J 8/1818* (2013.01); *B01J 8/1836* (2013.01); *B01J 8/40* (2013.01); *F28D 7/12* (2013.01); *B01J 2208/00132* (2013.01); *B01J 2208/00938* (2013.01); *F28D 2021/0022* (2013.01)

(58) Field of Classification Search
CPC .. F28D 1/0477; F28D 7/12; F28D 2021/0022; B01J 8/1818; B01J 8/40; B01J 2208/00132; B01J 2208/00938; B21D 53/09; F28F 13/12
USPC ........................................................ 165/142
See application file for complete search history.

(56) References Cited

U.S. PATENT DOCUMENTS

| | | | |
|---|---|---|---|
| 4,358,623 A | 11/1982 | Murphy et al. | |
| 5,027,893 A | 7/1991 | Cetinkaya et al. | |
| 5,286,690 A | 2/1994 | Hoffmann et al. | |
| 5,497,824 A | 3/1996 | Rouf | |
| 5,773,379 A | 6/1998 | Bonifay et al. | |
| 9,663,373 B2 | 5/2017 | Gautam et al. | |
| 9,695,106 B2 | 7/2017 | Gautam et al. | |
| 2010/0326640 A1* | 12/2010 | Higashiyama | B21D 53/06 165/154 |
| 2017/0108279 A1* | 4/2017 | Webb | F28D 1/0477 |

FOREIGN PATENT DOCUMENTS

| | | |
|---|---|---|
| CN | 2238083 Y | 10/1996 |
| CN | 2764777 Y | 3/2006 |

OTHER PUBLICATIONS

Product brochure, Koch heat transfer company, Twisted tube heat exchangers.

* cited by examiner

*Primary Examiner* — Davis D Hwu
(74) *Attorney, Agent, or Firm* — Paschall & Associates, LLC; James C. Paschall

(57) ABSTRACT

A process and apparatus for cooling catalyst in a catalyst cooler is disclosed. Nested tubes in the catalyst cooler have an undulating wall for improving heat transfer from the catalyst bed across the wall to the water inside the tubes. The outer tubes have an end wall at an inlet end opposed to an outlet end of a respective inner tube. The helical wall improves the efficiency of heat transfer to increase cooler duty for heavy feed stocks.

19 Claims, 1 Drawing Sheet

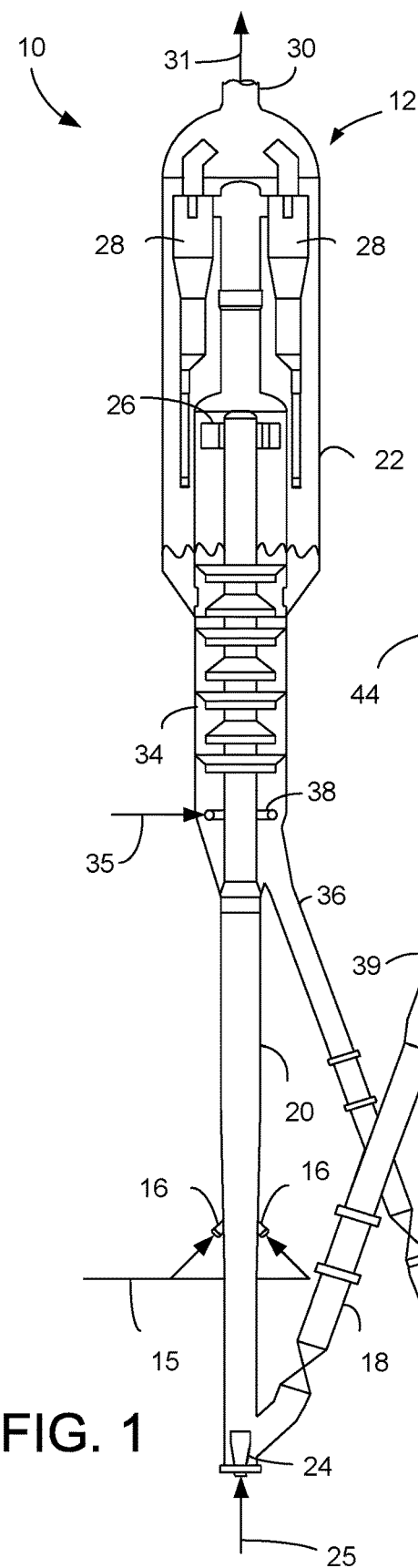
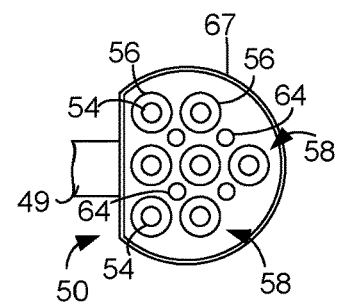
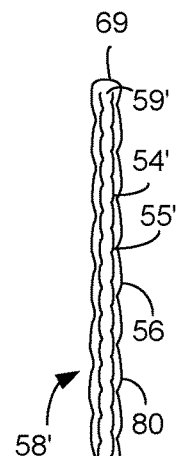
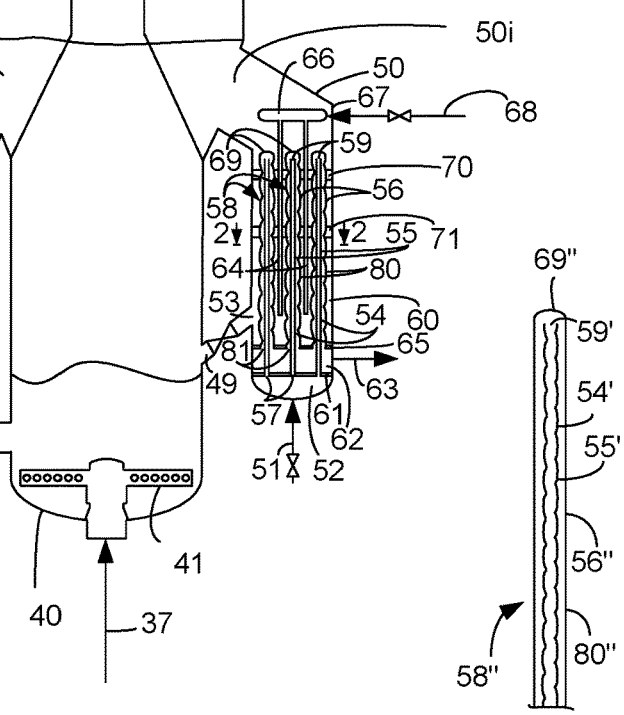
FIG. 1
FIG. 2
FIG. 3
FIG. 4

PROCESS AND APPARATUS FOR COOLING CATALYST

FIELD

The field is catalyst cooling and particularly for a catalytic regenerator such as in a fluid catalytic cracking (FCC) unit or an MTO unit.

BACKGROUND

FCC technology has undergone continuous improvement and remains the predominant source of gasoline production in many refineries. This gasoline, as well as lighter products, is formed as the result of cracking heavier, higher molecular weight, less valuable hydrocarbon feed stocks such as gas oil.

In its most general form, the FCC process comprises a reactor that is closely coupled with a regenerator, followed by downstream hydrocarbon product separation. Hydrocarbon feed contacts catalyst in the reactor to crack the hydrocarbons down to smaller molecular weight products. During this process, coke tends to accumulate on the catalyst. Coke must be burned off of the catalyst in a regenerator.

When a catalyst is exposed to oxygenates, such as methanol, to promote a reaction to olefins in a methanol to olefins process (MTO), carbonaceous material is generated and deposited on the catalyst. Accumulation of coke deposits interferes with the catalyst's ability to promote the MTO reaction. As the amount of coke deposit increases, the catalyst loses activity and less of the feedstock is converted to the desired olefin product. The step of regeneration removes the coke from the catalyst by combustion with oxygen, restoring the catalytic activity of the catalyst. The regenerated catalyst may then be exposed again to oxygenates to promote the conversion to olefins.

Conventional regenerators typically include a vessel having a spent catalyst inlet, a regenerated catalyst outlet and a combustion gas distributor for supplying air or other oxygen containing gas to the bed of catalyst that resides in the vessel. Cyclone separators remove catalyst entrained in the flue gas before the flue gas exits the regenerator vessel.

There are several types of catalyst regenerators in use today. The conventional bubbling bed regenerator typically has just one chamber in which air is bubbled through a dense catalyst bed. Spent catalyst is added and regenerated catalyst is withdrawn from the same dense catalyst bed. Relatively little catalyst is entrained in the combustion gas exiting the dense bed.

Two-stage bubbling beds and combustor regenerators have two chambers. In a two-stage bubbling bed regenerator, spent catalyst is added to a dense bed in a first, upper chamber stage and is partially regenerated with air. The partially regenerated catalyst is transported to a dense bed in a second, lower chamber stage and completely regenerated with air. The completely regenerated catalyst is withdrawn from the second chamber.

Complete catalyst regeneration can be performed in a dilute phase, fast-fluidized, combustion regenerator. Spent catalyst is added to a lower chamber and is transported upwardly by air under fast fluidized flow conditions while completely regenerating the catalyst. The regenerated catalyst is separated from the flue gas by a primary separator upon entering into an upper chamber in which regenerated catalyst and flue gas are disengaged from each other.

Catalyst coolers have been used to cool regenerated catalyst and permit the regenerator and the reactor to operate under independent conditions. In catalyst coolers, hot regenerated catalyst is cooled by indirect heat exchange with water which vaporizes to steam in nested cooler tubes. The steam is removed from the catalyst cooler for other uses; whereas, the cooled catalyst is returned to the regenerator.

Shut downs of a regenerator are costly due to the fact that product is not being made during shut down. Hence, shut downs should be minimized to maximize profitability.

If catalyst cooler operation is interrupted, the catalyst bed in the cooler must be re-fluidized. Improved ways of designing and operating catalyst coolers are sought.

Catalyst coolers are necessary to remove heat from the regenerator which is hot from burning hydrocarbon deposits from coked catalyst. As FCC units are called to process heavier feeds and MTO units are called to process more reactants, greater quantities of heat will need to be removed from regenerators. More efficient catalyst cooling equipment and processes are needed.

SUMMARY

We have discovered a process and apparatus for cooling catalyst with nested tubes comprising an undulating wall. The undulating wall provides greater turbulence and nucleation sites to produce greater boiling and heat transfer opportunities for the water coolant at the wall. The undulating wall can increase heat transfer coefficients from 10 to 40%, thus enabling greater heat removal and the processing of more or dirtier feed stocks.

Additional features and advantages of the invention will be apparent from the description of the invention, figures and claims provided herein.

BRIEF DESCRIPTION OF THE DRAWINGS

FIG. 1 is a schematic drawing of an FCC unit of the present invention.

FIG. 2 is an enlarged section taken at segment 2-2.

FIG. 3 is an enlarged, elevational drawing of an alternative embodiment of a single nested tube of FIG. 1.

FIG. 4 is an elevational drawing of an alternative embodiment of FIG. 3.

DEFINITIONS

The term "communication" means that material flow is operatively permitted between enumerated components.

The term "downstream communication" means that at least a portion of material flowing to the subject in downstream communication may operatively flow from the object with which it communicates.

The term "upstream communication" means that at least a portion of the material flowing from the subject in upstream communication may operatively flow to the object with which it communicates.

The term "direct communication" means that flow from the upstream component enters the downstream component without passing through any other intervening vessel.

The term "indirect communication" means that flow from the upstream component enters the downstream component after passing through an intervening vessel.

The term "bypass" means that the object is out of downstream communication with a bypassing subject at least to the extent of bypassing.

As used herein, the term "separator" means a vessel which has an inlet and at least two outlets.

As used herein, the term "predominant" or "predominate" means greater than 50 wt %, suitably greater than 75 wt % and preferably greater than 90 wt %.

As used herein, the term "a component-rich stream" means that the rich stream coming out of a vessel has a greater concentration of the component than the feed to the vessel.

DETAILED DESCRIPTION

High regenerator temperature limits the processing of atmospheric residue (AR) in FCC units. Catalyst coolers are installed to overcome high temperature limits and allow refineries to upgrade more AR. Flow through catalyst coolers can more efficiently cool catalyst. To enable upgrading a higher amount of AR in refineries which already utilize flow-through catalyst coolers, the only alternative is to install more catalyst coolers. However, the number of catalyst coolers which can be installed is often limited by the amount of space available around the regenerator and the number of standpipes which tie into the regenerator vessel. If space limitation is not a concern, installing additional catalyst coolers still has a high capital cost and a longer shut-down time for installation.

Proposed is a process and apparatus for using an undulating wall in the nested tubes in a catalyst cooler to increase cooler duty and heat transfer area across the wall of the tubes. The outer tubes have an end wall at their inlet end to oppose and redirect water coolant exiting from an outlet from the inner tubes. Undulating walls would allow reduction in gas superficial velocity in the catalyst cooler at a constant heat transfer coefficient to decrease erosion and increase tube life.

The embodiments herein are applicable to cooling a fluidized bed of particulate material. One such application is a catalyst cooler for cooling regenerated catalyst from a FCC or a MTO regenerator. For simplicity, the process and apparatus will be described in the context of an FCC unit.

Now turning to the FIGS. wherein like numerals designate like components, the FIG. 1 illustrates a process and apparatus comprising an FCC unit 10. An FCC unit 10 includes a catalytic reactor 12 and a regenerator 14 fluidly connected to each other. Process variables typically include a cracking reaction temperature of 400° to 600° C. and a catalyst regeneration temperature of 500° to 900° C. Both the cracking and regeneration occur at an absolute atmospheric pressure below 5 atmospheres.

The FIGURE shows a typical FCC process unit, in which a heavy hydrocarbon feed or raw oil stream in a line 15 is distributed by distributors 16 into a riser 20 to be contacted with a newly regenerated cracking catalyst entering from a regenerator conduit 18. This contacting may occur in the narrow riser 20, extending upwardly to the bottom of a reactor vessel 22. The catalyst is fluidized and lifted to the heavy hydrocarbon feed stream by fluidizing gas from a fluidizing distributor 24 fed by fluidizing line 25. Heat from the catalyst vaporizes the heavy hydrocarbon feed, and the heavy hydrocarbon feed is thereafter catalytically cracked to lighter molecular weight hydrocarbons in the presence of the catalyst as both are transferred up the riser 20 into the reactor vessel 22. The cracked light hydrocarbon products are thereafter separated from the cracking catalyst using cyclonic separators which may include a rough cut separator 26 and one or two stages of cyclones 28 in the reactor vessel 22. Product gases exit the reactor vessel 22 through a product outlet 30 into a product line 31 for transport to a product recovery section which is not shown. Inevitable side reactions occur in the riser 20 leaving coke deposits on the catalyst that lower catalyst activity. The spent catalyst requires regeneration for further use. Spent catalyst, after separation from the gaseous product hydrocarbon, falls into a stripping section 34 where steam from line 35 is fed to a stripping distributor 38 which strips any residual hydrocarbon vapor from the spent catalyst. After the stripping operation, the spent catalyst is fed to the catalyst regenerator 14 through a spent catalyst conduit 36.

The most common of such conventional heavy hydrocarbon feed streams is a VGO, which is typically a hydrocarbon material having a boiling range with an IBP of at least about 232° C. (450° F.), a T5 of about 288° C. (550° F.) to about 343° C. (650° F.), a T95 between about 510° C. (950° F.) and about 570° C. (1058° F.) and an EP of no more than about 626° C. (1158° F.) prepared by vacuum fractionation of atmospheric residue. Atmospheric residue (AR) is an alternative feedstock boiling with an IBP of at least about 315° C. (600° F.), a T5 between about 340° C. (644° F.) and about 360° C. (680° F.) and a T95 of between about 700° C. (1292° F.) and about 900° C. (1652° F.) obtained from the bottoms of an atmospheric crude distillation column. AR comprise many coke precursors and other contaminants. Other heavy hydrocarbon feed stocks which may serve as a heavy hydrocarbon feed stream include heavy bottoms from crude oil, heavy bitumen crude oil, shale oil, tar sand extract, deasphalted residue, products from coal liquefaction, and vacuum reduced crudes. A suitable heavy hydrocarbon feed stream also includes mixtures of the above hydrocarbons and the foregoing list is not exhaustive.

The FCC catalyst can be a single catalyst or a mixture of different catalysts. Generally, the catalyst may include any of the well-known catalysts that are used in the art of FCC, such as an active amorphous clay-type catalyst and/or a high activity, crystalline molecular sieve. Zeolites may be used as molecular sieves in FCC processes. Typically, the zeolitic molecular sieves appropriate for FCC have a large average pore size. Usually, molecular sieves with a large pore size have pores with openings of greater than about 0.7 nm in effective diameter defined by greater than about 10, and typically about 12, member rings. Suitable large pore zeolite catalysts may include synthetic zeolites such as X and Y zeolites, mordenite and faujasite. The zeolite can have any suitable amount of a rare earth metal or rare earth metal atoms in oxide form. Suitably, the FCC catalyst includes a large pore zeolite, such as a Y-type zeolite, and a matrix material comprising an active alumina material, a binder material, including either silica or alumina, and an inert filler such as kaolin. The ratio of zeolite to matrix in the FCC catalyst stream should be no more than 2. Other suitable FCC catalysts include Amber from Albemarle Corporation located in Baton Rouge, La., Stamina from BASF Corporation from Iselin, N.J. or Midas from WR Grace and Co. from Columbia, Md. A small to medium pore zeolite such as comprising a MFI type of catalyst may also be part of the FCC catalyst.

FIG. 1 depicts a regenerator 14 comprising a regenerator vessel 19 known as a combustor. However, other types of regenerators are suitable such as one or two-stage bubbling beds. In the catalyst regenerator 14, a stream of oxygen-containing gas, such as air, is introduced from a main air line 37 from a main air blower, not shown, through a main air distributor 41 to contact the spent catalyst in a first, lower chamber 40, combust coke deposited thereon, and provide regenerated catalyst and flue gas. The catalyst regeneration process adds a substantial amount of heat to the catalyst, providing energy to offset the endothermic cracking reactions occurring in the riser 20. Catalyst and air flow upwardly together along a combustor riser located within the catalyst regenerator 14 and, after regeneration, are initially disengaged by discharge into an upper chamber 42 through a disengager 43. Finer separation of the regenerated catalyst and flue gas exiting the disengager 43 is achieved using first and second stage separator cyclones 44, 46, respectively within the upper chamber 42 of the catalyst regenerator 14. Catalyst separated from flue gas dispenses through dip legs from cyclones 44, 46 into a catalyst bed while flue gas relatively lighter in catalyst sequentially exits cyclones 44, 46 and is discharged from the regenerator vessel 14 through a flue gas outlet 48 in a flue gas line 47.

Regenerated catalyst may be recycled back to the reactor 12 through the regenerator conduit 18. The riser 20 of the reactor 12 may be in downstream communication with the regenerator vessel 19 of the regenerator 14. The regenerator conduit has an inlet end connecting to the regenerator vessel 19, in an aspect the upper chamber 42 of the regenerator vessel 19, for receiving regenerated catalyst therefrom and an outlet end connecting to the riser 20 of the reactor 12 for transporting regenerated catalyst to the riser 20 of the reactor 12. As a result of the coke burning, the flue gas vapors exiting at the top of the catalyst regenerator 14 in the flue gas line 48 contain $SO_x$, $NO_x$, CO, $CO_2$, $N_2$, $O_2$ and $H_2O$, along with smaller amounts of other species. Additionally, some of these species may exit with regenerated catalyst exiting in a regenerator conduit 18 and enter the riser 20 of the reactor 12.

The regenerator 14 may include a catalyst cooler 50 in downstream communication with and fluid connection to the regenerator 14 and particularly the regenerator vessel 19. The catalyst cooler cools the hot catalyst from the regenerator to remove heat from the FCC unit 10. Catalyst is transported from the regenerator 14, particularly from the bed 39 in the upper chamber 42 of the regenerator vessel 19, into the catalyst cooler 50. In a combustor regenerator shown in the FIG. 1, regenerated catalyst may be transported from the upper chamber 42 into the lower chamber 40 of the regenerator vessel 19 through the catalyst cooler 50 and/or through recycle conduits that are not shown. Regenerated catalyst enters the catalyst cooler 50 through an inlet 50*i*. Regenerated catalyst may exit the catalyst cooler back through the inlet 50*i* in a back-mix catalyst cooler. In a flow-through catalyst cooler, cooled catalyst exits through an outlet 53 to a cool catalyst conduit 49 which introduces cooled, regenerated catalyst back into the lower chamber 40 through a control valve. Evidently, if the regenerator only has a single chamber, inlet 50*i* would be from and the outlet 53 would be to the same regenerator chamber.

The catalyst cooler 50 comprises a vessel with an outer wall 67 that includes at least one nested tube pair 58 comprising an inner tube 54 nested within at least an outer tube 56. In an aspect, the catalyst cooler 50 comprises a vessel that includes a plurality of nested tube pairs 58 comprising a plurality of inner tubes 54 nested within and surrounded by a respective outer tube 56 in a plurality of outer tubes. The nested tube pairs 58 may be vertically oriented. Only three nested tube pairs are shown in FIG. 1, but many more are contemplated. Liquid water—from a water line 51 feeds a water manifold 52. The water manifold 52 is defined by a water tube sheet 61 that only communicates with the inner tube(s) 54. The inner tubes 54 are in direct, downstream communication with the water manifold 52. Water is delivered to inlet ends 57 of the inner tubes 54. The inlet ends 57 are open and coincident with openings in the water tube sheet 61. Water flows up the inner tube(s) 52 into the interior of the catalyst cooler 50 containing a catalyst bed 60. Heat transfers across respective walls 55 of the inner tubes 54 from heated water in the outer tubes 56. The water in the outer tubes 56 indirectly absorbs heat from the hot, regenerated catalyst in the catalyst bed 60, thereby indirectly cooling the regenerated catalyst in the catalyst bed, while heating the water in the outer tubes 56. The transfer of heat to the water in the outer tube(s) 56 and the inner tube(s) 54 vaporizes it to higher pressure steam. The vaporized water is discharged through open outlet ends 59 of the inner tubes 54 into the outer tubes 56. The outer tubes 56 are equipped with end walls 69 defining closed inlet ends that are opposed to and spaced from the open outlet ends 59 of the inner tubes 54. The vaporized water is discharged from the outlet ends 59 against the end walls 69 of the outer tubes 56 which receive water interiorly to the inlet ends. The vaporized water reverse its flow direction upon entering the outer tubes 56 and flows in an opposite direction.

The nested tubes 58 comprise walls that have an undulating configuration. The undulating walls may comprise a helical wall, a twisted wall or another type of non-cylindrical wall that defines peak and valleys along its length. Alternatively or conjunctively, the peaks and valleys may be defined along the perimeter of the undulating wall. The undulating walls are preferably helical. The undulations are preferably uniform, but they do not have to be uniform. For example, the outer walls 80 of the outer tubes 56 may have an undulating configuration to increase turbulence around the walls of the outer tubes and thereby improve heat transfer across the undulating outer walls 80. The helical wall 80 increases catalyst cooling and boiling of the water in the tubes 56. As the vaporized water travels through the outer tubes 56 heat is passed from the catalyst bed 60 across the undulating outer walls 80 of the outer tubes 56 to the water in the outer tubes 56. In FIG. 1, the inner tubes 54 are not undulating, but cylindrical.

The steam which may be mixed with liquid water travels down the outer tube(s) 56 annular to the respective inner tube(s) 54 in the nested tube pair 58 and exits from open outlet ends 81 of the outer tubes 56. The outlet ends 81 have openings that are coincident with openings in the outlet tube sheet 65. Vaporized water exits the outer tubes 56 and is withdrawn from the catalyst bed 60 from the outer tube(s) into the outlet manifold 62. The outlet manifold 62 is defined by the water tube sheet 61 and an outlet tube sheet 65. The outlet manifold is in direct, downstream communication with said outer tubes 56 and collects vaporized water from the outer tubes. The inner tubes 54 extend through the outlet manifold 62 but only communicate with the outlet manifold through the outlet tubes 56 which directly communicate with the outlet manifold through the outlet tube sheet 65. Steam from the outlet manifold 62 exits the catalyst cooler 50 in a steam line 63.

Fluidization lances 64 receive fluidization gas such as air from a fluidization manifold 66 that communicates only with the fluidization lances for fluidizing regenerated catalyst in the catalyst bed 60 in the catalyst cooler 50. The fluidization manifold 66 is fed by a fluidization line 68. The fluidization lances 64 may emit fluidization gas from their lower end. A conventional example of a catalyst cooler is provided in U.S. Pat. No. 5,027,893.

Baffle guides 70 and 71 extend across the catalyst cooler 50 to hold internals, nested tube pairs 58, in place laterally but allow them to freely expand and contract longitudinally due to thermal forces.

The catalyst cooler 50 receives hot catalyst from the catalyst bed 39 in the regenerator 14 through inlet 50*i* which collects in the catalyst bed 60 in the catalyst cooler. Hot catalyst is cooled in the catalyst bed 60 by water circulating though the nested tube pairs 58. In a back mixed cooler, catalyst enters and exits the catalyst cooler 50 through the same inlet 50*i*. In a flow through catalyst cooler, cooled catalyst exists the catalyst cooler 50 through the outlet 53.

FIG. 2 is a sectional view taken at 2-2 in FIG. 1. More or less fluidization distributors 64 may be used. Four fluidization distributors 64 are shown in FIG. 2 located between seven nested tube pairs 58 comprising inner tubes 54 and outer tubes 56.

FIG. 3 is a partial view of a nested tube pair 58' of FIG. 1 but with the inner wall 55' of the inner tube 54' also having an undulating configuration as well as the outer wall 80 to promote heat transfer across the undulating inner wall 55'. Many of the elements in FIG. 3 have the same configuration as in FIG. 1 and bear the same reference number. Elements in FIG. 3 that correspond to elements in FIG. 1 but have a different configuration bear the same reference numeral as in FIG. 1 but are marked with a prime symbol ('). In FIG. 3, the outer wall 80 of the outer tube 54 is also undulating. The undulating inner wall 55' of the inner tube 54' promotes heat transfer across the wall 55' from heated water vapor in the outer tube 56 to the water in the inner tube 54'. The inner tube 54' has an open outlet end 59' while the outer tube 56 defines an end wall 69 at the inlet end thereof. Everything else in FIG. 3 is the same as in FIG. 1 with these noted exceptions.

FIG. 4 is a partial view of a nested tube pair 58" of FIG. 3 with the inner wall 55' of the inner tube 54' having an undulating configuration to promote heat transfer across the undulating inner wall 55', but the outer wall 80" does not have an undulating configuration. Many of the elements in FIG. 4 have the same configuration as in FIG. 3 and bear the same reference number. Elements in FIG. 4 that correspond to elements in FIG. 3 but have a different configuration bear the same reference numeral as in FIG. 3 but are marked with a double prime symbol ("). In FIG. 3, the outer wall 80" of the outer tube 54" is not undulating but cylindrical. The inner tube 54' has an open outlet end 59' while the outer tube 56" defines an end wall 69" at the inlet end thereof. Everything else in FIG. 4 is the same as in FIG. 3 with these noted exceptions.

SPECIFIC EMBODIMENTS

While the following is described in conjunction with specific embodiments, it will be understood that this description is intended to illustrate and not limit the scope of the preceding description and the appended claims.

A first embodiment of the invention is a process for cooling a bed of catalyst in a catalyst cooler comprising passing water from a water manifold to an inner tube; heating water in the inner tube by indirect heat exchange with heated water in an outer tube across an inner wall to vaporize at least some of the water in the inner tube; passing vaporized water to an outer tube nested around the inner tube; passing heat from the catalyst bed across an outer wall of the outer tube to the water in the outer tube; collecting the vaporized water in an outlet manifold; fluidizing the catalyst in the catalyst bed; wherein at least one of the inner wall and the outer wall comprises an undulating wall. An embodiment of the invention is one, any or all of prior embodiments in this paragraph up through the first embodiment in this paragraph further comprising a plurality of inner tubes and a plurality of outer tubes are respectively nested around a respective inner tube and passing water from the water manifold to the plurality of inner tubes, transferring heat from the catalyst bed across a helical wall of a respective one of the outer tubes to water in the respective one of the outer tubes and passing vaporized water from the outer tubes to the outlet manifold; wherein each of the outer tubes have a helical wall. An embodiment of the invention is one, any or all of prior embodiments in this paragraph up through the first embodiment in this paragraph further comprising discharging the water from the inner tubes against an end wall of the outer tubes and reversing direction of the water in the outer tubes. An embodiment of the invention is one, any or all of prior embodiments in this paragraph up through the first embodiment in this paragraph wherein the outer tubes have undulating outer walls. An embodiment of the invention is one, any or all of prior embodiments in this paragraph up through the first embodiment in this paragraph wherein the inner tubes have undulating inner walls.

A second embodiment of the invention is an apparatus for cooling a bed of catalyst comprising a vessel comprising a plurality of inner tubes each surrounded by an outer tube to comprise a plurality of nested tubes, the nested tubes comprising an undulating wall; a water manifold defined by a water tube sheet and in communication with the plurality of inner tubes; and an outlet manifold defined by an outlet tube sheet and in communication with the plurality of outer tubes; a distributor for distributing fluidizing gas to the catalyst cooler. An embodiment of the invention is one, any or all of prior embodiments in this paragraph up through the second embodiment in this paragraph wherein the outer tubes have an open outlet end and a closed inlet end. An embodiment of the invention is one, any or all of prior embodiments in this paragraph up through the second embodiment in this paragraph wherein the outer tube has an end wall at the inlet end. An embodiment of the invention is one, any or all of prior embodiments in this paragraph up through the second embodiment in this paragraph further comprising the end wall of the outer tube being opposed to an open outlet end of the inner tube. An embodiment of the invention is one, any or all of prior embodiments in this paragraph up through the second embodiment in this paragraph further comprising a water tube sheet with openings coincident with inlet ends of the inner tubes. An embodiment of the invention is one, any or all of prior embodiments in this paragraph up through the second embodiment in this paragraph further comprising an outlet tube sheet with openings coincident with outlet ends of the outer tubes. An embodiment of the invention is one, any or all of prior embodiments in this paragraph up through the second embodiment in this paragraph wherein the inner tubes each have an undulating wall. An embodiment of the invention is one, any or all of prior embodiments in this paragraph up through the second embodiment in this paragraph wherein the outer tubes each have an undulating wall.

A third embodiment of the invention is an apparatus for cooling catalyst comprising a catalyst cooler comprising a plurality of inner tubes each surrounded by an outer tube to comprise a plurality of outer tubes; each of the outer tubes have an undulating outer wall; a water manifold defined by a water tube sheet and in communication with the plurality of inner tubes; an outlet manifold defined by an outlet tube sheet and the water tube sheet, the outlet manifold in communication with the plurality of outer tubes; and a distributor for distributing fluidizing gas to the catalyst cooler. An embodiment of the invention is one, any or all of prior embodiments in this paragraph up through the third embodiment in this paragraph wherein the outer tubes have an open outlet end and a closed inlet end. An embodiment of the invention is one, any or all of prior embodiments in this paragraph up through the third embodiment in this paragraph wherein the outer tube has an end wall at the inlet end. An embodiment of the invention is one, any or all of prior embodiments in this paragraph up through the third embodiment in this paragraph further comprising the end wall of the outer tube being opposed to an open outlet end of the inner tube. An embodiment of the invention is one, any or all of prior embodiments in this paragraph up through the third embodiment in this paragraph further comprising a water tube sheet with openings coincident with inlet ends of the inner tubes. An embodiment of the invention is one, any or all of prior embodiments in this paragraph up through the third embodiment in this paragraph further comprising an outlet tube sheet with openings coincident with outlet ends of the outer tubes. An embodiment of the invention is one, any or all of prior embodiments in this paragraph up through the third embodiment in this paragraph wherein the inner tubes each have an undulating wall.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

The invention claimed is:

1. An apparatus for cooling a bed of catalyst comprising:
a vessel comprising a plurality of inner tubes each surrounded by an outer tube to comprise a plurality of nested tubes, said nested tubes comprising an undulating wall, wherein said outer tubes have an open outlet end and a closed inlet end;
a water manifold defined by a water tube sheet and in communication with said plurality of inner tubes; and
an outlet manifold defined by an outlet tube sheet and in communication with said plurality of outer tubes;
a distributor for distributing fluidizing gas to said catalyst cooler.

2. The apparatus of claim 1 wherein said outer tube has an end wall at said inlet end.

3. The apparatus of claim 2 further comprising said end wall of said outer tube being opposed to an open outlet end of said inner tube.

4. The apparatus of claim 3 further comprising a water tube sheet with openings coincident with inlet ends of said inner tubes.

5. The apparatus of claim 3 further comprising an outlet tube sheet with openings coincident with outlet ends of said outer tubes.

6. The apparatus of claim 1 wherein said inner tubes each have an undulating wall.

7. The apparatus of claim 1 wherein said outer tubes each have an undulating wall.

8. An apparatus for cooling catalyst comprising:
a catalyst cooler comprising a plurality of inner tubes each surrounded by an outer tube to comprise a plurality of outer tubes;
each of said outer tubes have an undulating outer wall, wherein said outer tubes have an open outlet end and a closed inlet end;
a water manifold defined by a water tube sheet and in communication with said plurality of inner tubes;
an outlet manifold defined by an outlet tube sheet and said water tube sheet, said outlet manifold in communication with said plurality of outer tubes; and
a distributor for distributing fluidizing gas to said catalyst cooler.

9. The apparatus of claim 8 wherein said outer tube has an end wall at said inlet end.

10. The apparatus of claim 9 further comprising said end wall of said outer tube being opposed to an open outlet end of said inner tube.

11. The apparatus of claim 10 further comprising a water tube sheet with openings coincident with inlet ends of said inner tubes.

12. The apparatus of claim 11 further comprising an outlet tube sheet with openings coincident with outlet ends of said outer tubes.

13. The apparatus of claim 8 wherein said inner tubes each have an undulating wall.

14. An apparatus for cooling a bed of catalyst comprising:
a vessel comprising a plurality of inner tubes each surrounded by an outer tube to comprise a plurality of nested tubes, said nested tubes comprising an undulating wall, said outer tubes have an open outlet end and a closed inlet end, wherein said outer tube has an end wall at said inlet end;
a water manifold defined by a water tube sheet and in communication with said plurality of inner tubes;
an outlet manifold defined by an outlet tube sheet and in communication with said plurality of outer tubes; and
a distributor for distributing fluidizing gas to said catalyst cooler.

15. The apparatus of claim 14 further comprising said end wall of said outer tube being opposed to an open outlet end of said inner tube.

16. The apparatus of claim 15 further comprising a water tube sheet with openings coincident with inlet ends of said inner tubes.

17. The apparatus of claim 15 further comprising an outlet tube sheet with openings coincident with outlet ends of said outer tubes.

18. The apparatus of claim 14 wherein said inner tubes each have an undulating wall.

19. The apparatus of claim 14 wherein said outer tubes each have an undulating wall.

* * * * *